A. LASCHINSKI.
AUTOMATIC RAILWAY BRAKE CONTROL.
APPLICATION FILED SEPT. 15, 1913.

1,115,691.

Patented Nov. 3, 1914.

2 SHEETS—SHEET 1.

WITNESSES.

INVENTOR.
August Laschinski.
By Morsell & Caldwell
ATTORNEYS.

A. LASCHINSKI.
AUTOMATIC RAILWAY BRAKE CONTROL.
APPLICATION FILED SEPT. 15, 1913.
1,115,691.
Patented Nov. 3, 1914.
2 SHEETS—SHEET 2.
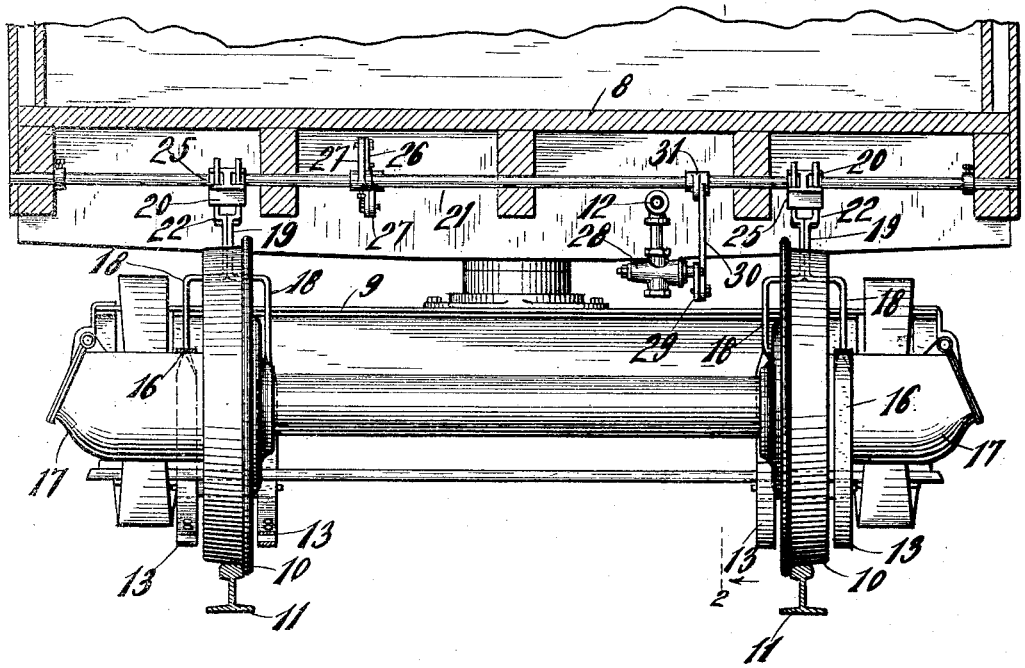
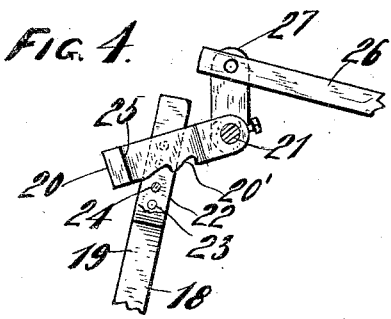
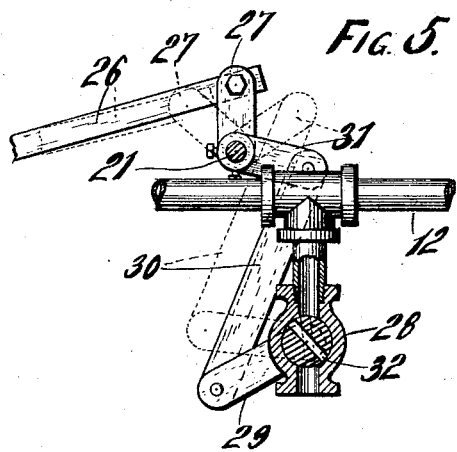
WITNESSES
INVENTOR
August Laschinski
By Morsell and Caldwell
ATTORNEYS

UNITED STATES PATENT OFFICE.

AUGUST LASCHINSKI, OF MILWAUKEE, WISCONSIN.

AUTOMATIC RAILWAY-BRAKE CONTROL.

1,115,691.  Specification of Letters Patent.  Patented Nov. 3, 1914.

Application filed September 15, 1913. Serial No. 789,765.

*To all whom it may concern:*

Be it known that I, AUGUST LASCHINSKI, a citizen of the United States, and resident of Milwaukee, in the county of Milwaukee and State of Wisconsin, have invented new and useful Improvements in Automatic Railway-Brake Controls, of which the following is a description, reference being had to the accompanying drawings, which are a part of this specification.

This invention relates to improvements in automatic railway brake control.

It is one of the objects of the present invention to provide an automatic railway brake control in which the brakes of the railway train will be applied in the event of any of the wheels leaving the track, thus stopping the train in time to prevent further derailment and damage.

A further object of the invention is to provide an automatic railway brake control which is of simple and strong construction, is easily applied to a car and is positive in its action.

With the above and other objects in view the invention consists of the improved automatic railway brake control and its parts and combinations as set forth in the claims and all equivalents thereof.

Figure 1:
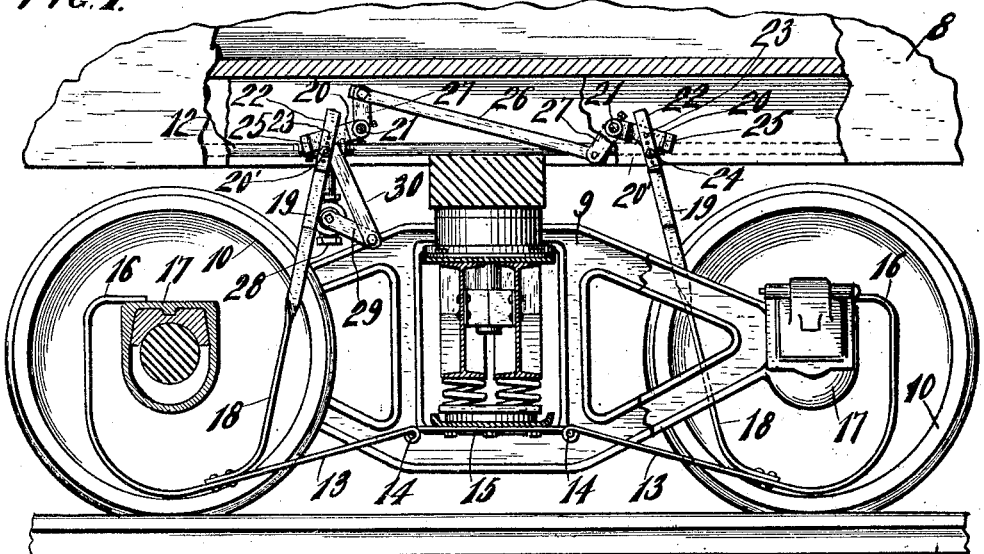
Figure 2:
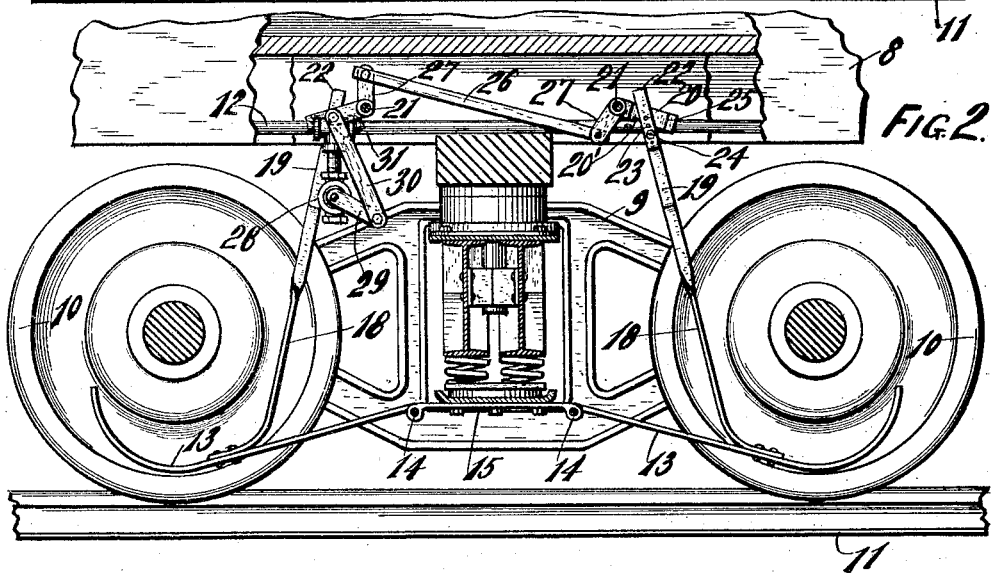

In the accompanying drawings in which the same reference characters indicate the same parts in all of the views: Figure 1 is a side view of a car truck and wheels and a portion of a car with the improved brake control applied thereto, parts being broken away; Fig. 2 is a vertical sectional view thereof taken on line 2—2 of Fig. 3; Fig. 3 is a transverse sectional view of a portion of a car body and the truck thereof; Fig. 4 is a detail view on a larger scale of one of the levers and connected parts; and, Fig. 5 is a detail sectional view of the air valve and the levers connected thereto.

Referring to the drawings the numeral 8 indicates a portion of a car body, 9 one of the trucks, 10 the wheels thereof, 11 the rails, and 12 the air brake train pipe controlling the application of the brakes to the wheels. As the brakes are of ordinary construction and well known in the art it is not thought necessary to illustrate the same or the air control thereof.

Curved guard members 13 positioned on opposite sides of each wheel, a short distance above the rails, have a pivotal connection 14 at their inner ends with holding plates 15 which are bolted to the lower portions of the trucks. The free ends of the guards curve upwardly and the curved ends 16 of the outer guards extend over and rest upon the journal boxes 17 for the wheel axles to hold the guards elevated above the rails.

Upwardly extending arms 18 secured medially in any manner desired to the guard members on opposite sides of the wheels are joined together above the wheels as indicated by the numeral 19 and are then diverged to straddle the rock shaft arms 20 mounted on the rock shaft 21 which extends transversely across and through the timbers of the car body 8. The upper diverged portions 22 of the arms 18 are provided with bolt openings 23 to adjustably receive the bolts 24 which extend across the diverged portions to engage the serrated lower edges 20′ of the rock shaft arms 20. The portions of the rack shaft arms 20 straddled by the arms 18 are recessed or of less thickness than other portions to form shoulders 25 to prevent the arms 18 from slipping off the ends of the levers. The rock shafts 21 above each truck are connected together by connecting bars 26 which are pivoted to arms 27 also mounted on the rock shafts 21. The air pipe 12 is provided with a plug valve 28 having a controlling lever 29 which is connected to one of the rock shafts 21 by a link 30 and a lever arm 31.

The opening 32 of the valve is positioned to normally close the opening to the air pipe so that the compressed air in the pipe will hold the brakes in disengaging position but if any of the wheels should leave the rails the rails would be engaged by the guards and the guards would be swung upwardly and the connected parts swung to positions to open the valve. Upon the opening of the valve the air will escape and the brakes will be automatically applied and the train stopped to prevent serious damage.

From the foregoing description it will be seen that the automatic brake control is of simple construction and is well adapted for the purpose desired.

What I claim as new and desire to secure by Letters Patent is:

1. In combination with a railway car of an automatic brake control therefor, comprising a car-air-brake-pipe having a valve, guard members mounted on one of the car trucks and positioned on opposite sides of a car wheel, and means connecting the guard members to the valve to open the valve and apply the brakes when the wheel leaves the rail and one of the guard members engages the rail.

2. In combination with a railway car of an automatic brake control therefor, comprising a car-air-brake-pipe having a valve, guard members pivotally connected to the car truck and extending on opposite sides of a car wheel, upstanding arms projecting from the guard members, a rock shaft mounted above the guard members and provided with projecting arms one of which is engaged by the upper ends of the upstanding arms, and means connecting the other rock shaft arm to the valve to open the valve when one of the guard members engages the rail.

3. In combination with a railway car of an automatic brake control therefor, comprising a car-air-brake-pipe having a valve, guard members pivotally connected to the car truck and extending in opposite directions on each side of each car wheel, the outer ends of the guard members curving upwardly and some of the members having their ends resting on the journal boxes of the wheels, upstanding arms connected to and projecting from medial portions of the guards, rock shafts mounted above the guard members and provided with projecting arms some of which are engaged by the upper ends of the upstanding arms, a link connecting an arm of each shaft together, and means connecting an arm of one of the shafts to the valve to open the valve when one of the guard members engages the rail.

In testimony whereof, I affix my signature, in presence of two witnesses.

AUGUST LASCHINSKI.

Witnesses:
KATHERINE HOLT,
EMILY SCHOWALTER.

Copies of this patent may be obtained for five cents each, by addressing the "Commissioner of Patents, Washington, D. C."